Inventor
Raymond P. Leveque
By his Attorney
Scott R. Foster

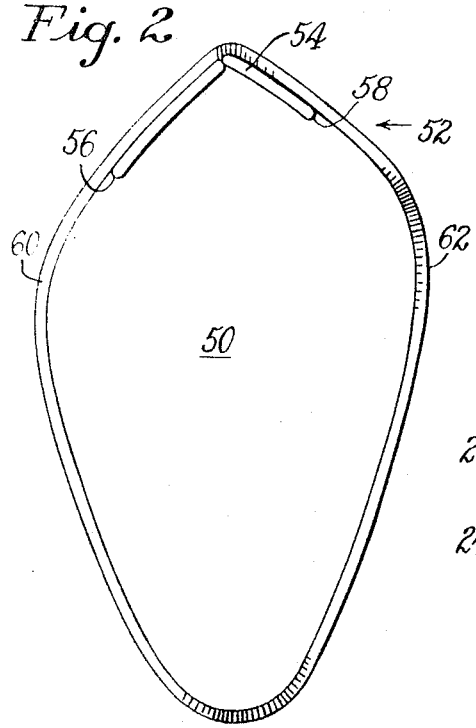
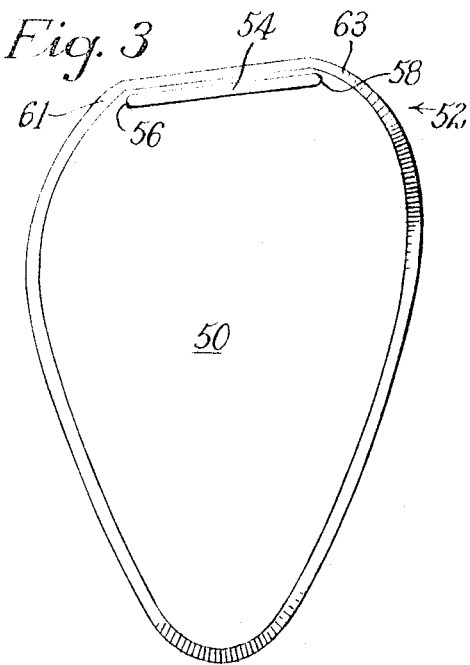
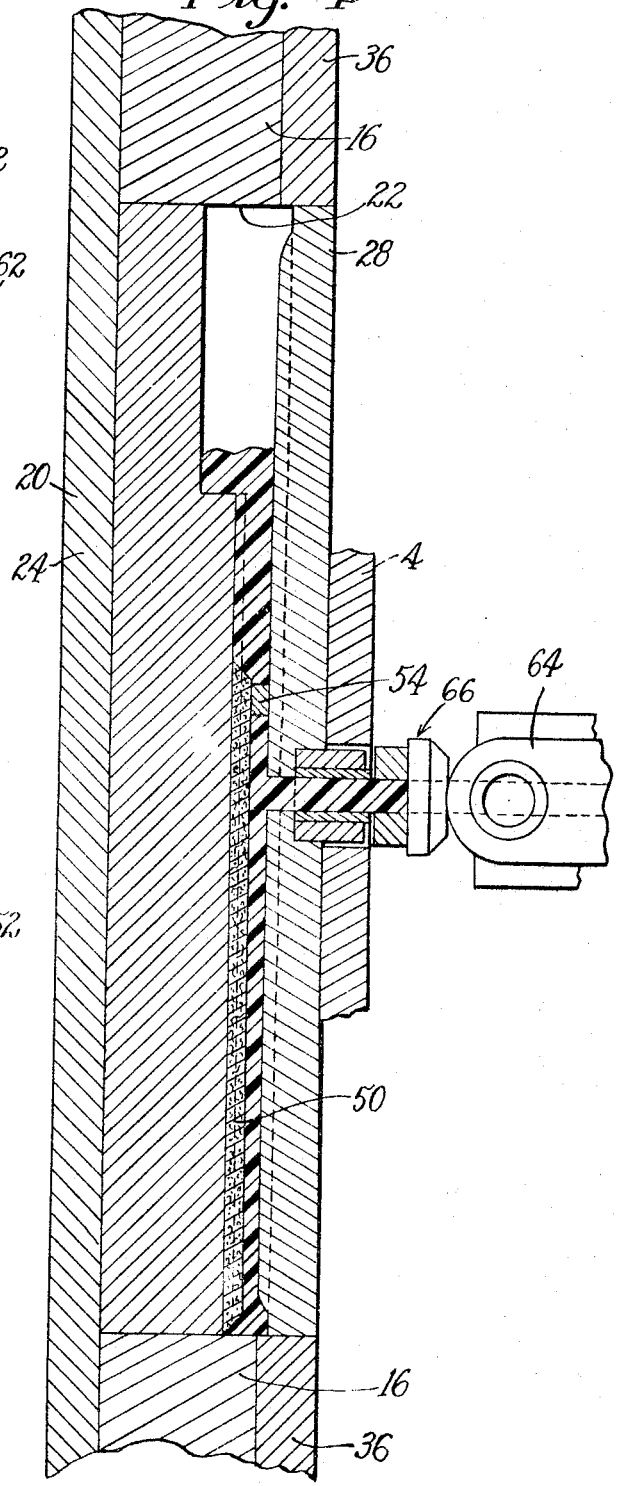

United States Patent Office 3,320,687
Patented May 23, 1967

3,320,687
SHOE BOTTOM UNITS
Raymond P. Leveque, Georgetown, Mass., assignor to United Shoe Machinery Corporation, Flemington, N.J., a corporation of New Jersey
Filed Feb. 3, 1965, Ser. No. 430,138
8 Claims. (Cl. 36—34)

ABSTRACT OF THE DISCLOSURE

A preformed tread piece for incorporation into a premolded sole and heel unit. The tread piece is positioned in a mold cavity having heel and forepart portions into which injection molding material is injected. The tread piece is provided with means for retarding the flow of the injected material into one of the mold cavity portions and promoting complete filling of the second mold cavity portion.

---

This invention relates to injection molding, and more particularly to a tread piece for an injection molded outsole unit which contributes to the efficient production of such outsole units by injection molding means.

The invention is herein illustrated in connection with the molding of shoe sole and heel units by the use of equipment of the type disclosed in United States patent application Ser. No. 220,178 filed Aug. 29, 1962, now Patent No. 3,172,162 in the name of Paul W. Senfleben. However it will be understood that other machines might be employed in connection with the invention.

Such machines usually include a mold assembly having a male and female mold member, each having the peripheral shape of an article to be formed. In a shoe sole mold assembly, the edge face of the sole is formed by the female mold member surrounding the male mold member in contiguous relation thereto. Engagement of the mold members closes the mold cavity and clamping means are usually employed to retain the mold members in their cooperative relationship. One of the mold members is in communication with a mold charging source which furnishes the fluid material, usually a plastic or rubber material, for filling the mold cavity.

It has been common practice for injection molded soles, or sole and heel units, to be formed entirely of the injected material. However, at times the injection molded sole units have included a tread insert, usually leather, which forms the bottom portion of the forepart of the sole unit, the remainder of the unit being composed of the injected material. The insert is enclosed in its proper position within the mold cavity and the injected material forms around it thereby producing, for example, a plastic outsole unit having a leather forepart tread. One difficulty encountered in the production of such combination outsole units has been the lack of complete charging of the mold cavity in the forepart area, i.e., the area on the shoe side of the insert. The difficulty is caused by the resistance of the injected fluid to flow through the small passage between the insert and the mold compared to the much larger passage available to the injected fluid in the heelward direction.

Accordingly, it is an object of the present invention to provide a means for promoting full charging of the mold cavity containing a tread insert.

More specifically, it is an object of the present invention to provide a tread insert having means thereon for promoting toeward flow of the injected fluid and full charging of the mold cavity.

With the above and other objects in view, the present invention contemplates the provision of an improved tread insert for an injection molded outsole unit. The tread insert is characterized by a structure extending into the shank portion of the unit, and a rib attached to the foot facing side of the tread piece and extending widthwise substantially along the heelward edge of the insert outwardly toward either side to points respectively short of the side edges of the tread piece. Thus, upon charging of the mold cavity containing the insert the path of the injected fluid heelwardly is retarded by the insert rib. The obstruction tends to equalize resistance of the flow of plastic heelwardly and toewardly thus promoting full charging of the forepart section as well as the heelpart section. Inasmuch as the ends of the rib are short of the side mold members the injected fluid still reaches the heel area by flowing around the ends of the rib.

The above and other features of the invention, including various novel details of construction and combinations of parts will now be more particularly described with reference to the accompanying drawings and pointed out in the claims. The principles and features of this invention may be employed in varied and numerous embodiments without departing from the scope of the invention.

In the drawings,

FIG. 2 is a plan view of one embodiment of the invention, showing an insert having a rib attached;

FIG. 3 is a plan view of another embodiment of the invention, showing an insert having a rib attached; and FIG. 4 is an elevational view of parts of a sole and heel mold assembly, shown in section, and showing in process the injection molding of a sole and heel unit having a tread insert.

Figure 1:
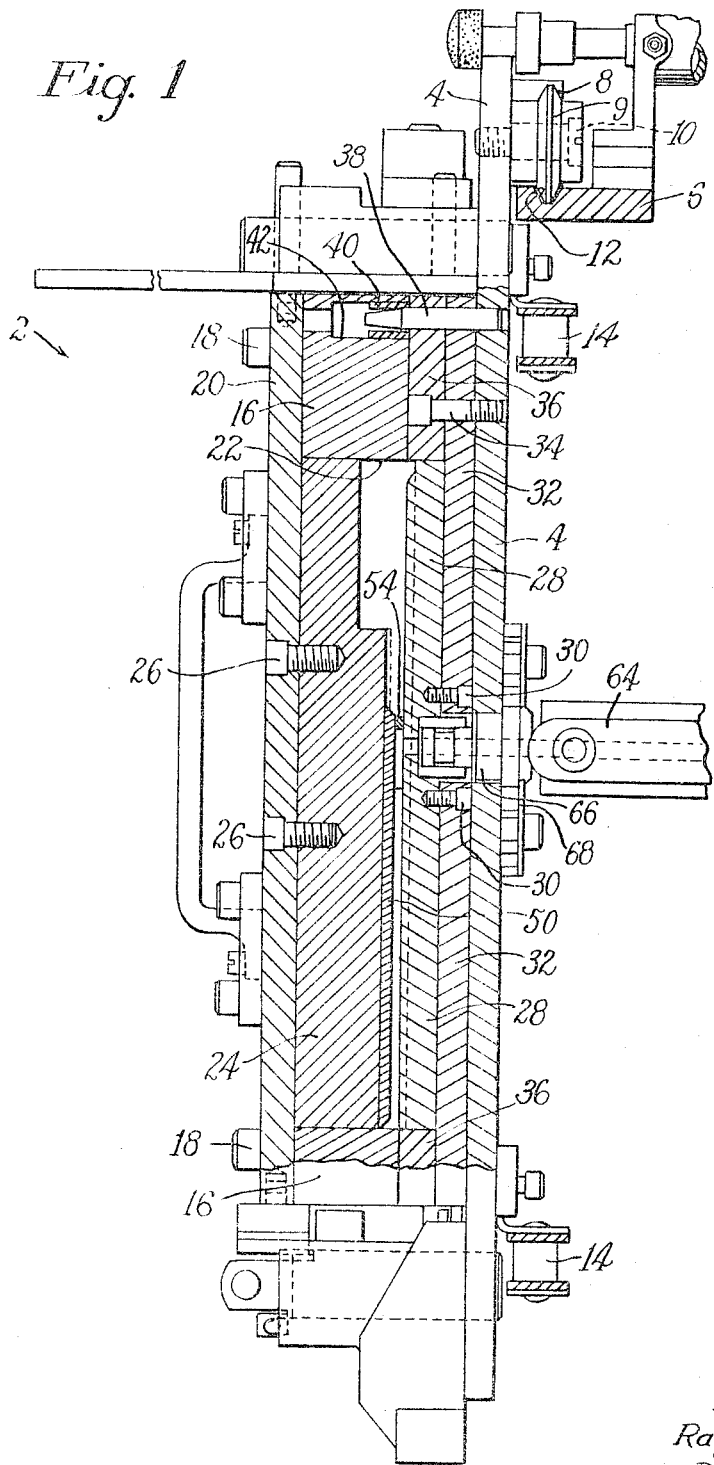
FIG. 1 is an elevational view of a sole and heel mold assembly, shown in section, and containing a tread insert having a rib attached.

The invention is illustrated in the drawings as embodied in a tread piece to be incorporated in a premolded sole and heel unit by a machine of the type disclosed in the application of Senfleben hereinafter referred to. Machines of this type have a plastic injecting or mold charging mechanism and a plurality of ambulatory mold assemblies, each carrying mold parts for molding a shoe sole. The machine is provided with an endless conveyor system on which a plurality of ambulatory assemblies are mounted at uniformly spaced positions. The conveyor system advances the ambulatory assemblies successively to a discharging station from which a molded sole is removed or discharged from the mold assembly and the mold assembly is closed preparatory to another injection or mold charging operation. From the discharging station the ambulatory assembly is advanced in one step to the injection station in which the mold cavity is charged with fluid plastic to form another shoe sole.

Referring to FIG. 1 which shows an ambulatory mold assembly 2 in the mold charging station, the illustrated assembly is mounted on a vertically disposed carrier plate 4 which is suspended from an elevated rail 6 by means of two rolls, one of which is illustrated at 8 in FIG. 1. The ambulatory mold assembly 2 is guided for rectilinear movement on the rail 6 by guide rolls 9, one of which is shown in FIG. 1, which travel in a suitable groove 12 formed in the rail 6. The rolls 9 are freely mounted on the shank portion of a suitable screw 10 secured to the plate 4.

For conveying a plurality of ambulatory assemblies from station to station, the machine is provided with two chains 14 vertically spaced from each other and mounted on suitable sprockets (not shown), one pair of sprockets being driven to actuate the chains.

Referring to the mold assembly, an outer mold member 16 is removably secured by screws 18 to a forward platen 20. The outer mold member has a sole-shaped opening extending therethrough, the wall 22 of which forms the edge face of the sole. Closely fitted into the opening of the outer mold member 16 is a bottom mold member 24 which is seated upon the inner surface of the platen 20 and removably attached thereto by screws 26. The mold assembly is completed by an upper mold member 28 having the same peripheral shape as the bottom mold member 24 and contoured to form the upper attaching surface of the sole. The upper mold member 28 is removably attached by screws 30 to a rear platen 32 which is removably attached to the carrier plate 4 by screws, one of which is shown at 34 in FIG. 1. The screws 34 extend through a spacer plate 36 and attach it to the platen 32. The spacer plate 36 is substantially thinner than the outer mold member 16, but otherwise is similar in shape to said mold member. The spacer plate 36 serves to determine the extent of penetration of the upper mold member 28 into the cavity defined by the wall 22 of the outer mold member 16. For accurately registering the outer mold member 16 with the upper mold member 28, two dowel pins 38 (one shown in FIG. 1) are mounted in aligned bores extending through the spacer plate 36, the rear platen 32, and the carrier plate 4. Tapered end portions of the dowel pins 38 projecting forwardly from the spacer plate 36 are received within bushings 40 during the advancement into closing position of the assembly comprising the outer mold member 16, the bottom mold member 24, and the forward platen 20. The bushings 40 are tightly fitted into suitable counterbores 42 formed in the outer mold member 16. The opening and closing movements of the mold members are described in detail in the hereinbefore referred to patent application.

The forepart tread piece for use in such molding assemblies will now be described. Referring to FIGS. 2 and 3, it may be seen that the insert comprises a tread piece 50 having a portion, generally designated 52, extending into the shank area. A rib 54 is attached to the upper side, or foot facing side, of the insert in the area of the shankward extending portion.

FIG. 2 shows a tread piece 50 having a V-structure extending into the shank area. In this embodiment the rib 54 may be of a V-configuration, conforming to the shape of the shank portion of the insert. The outer ends 56, 58 of the rib 54 are short of the extreme width points 60, 62 of the insert and are likewise short of the sides 22 of the mold cavity. In FIG. 3 there is shown an insert having a straight-across cut in the shank area. In this instance, a rib extending straight across the tread, conforming to the shank edge of the tread, is preferably utilized. The outer ends 56, 58 of the rib 54 are in this embodiment short of the side edges 61, 63 of the insert. The rib 54 may be attached to the tread piece 50 by known adhesives and may be formed in two segments, as appear in FIG. 2, or by a single piece as appears in FIG. 3.

Although flow control within the mold cavity could be attained by providing a rib on the upper wall of the mold, such an arrangement would leave an elongated cavity in the upper side of the sole. By positioning the rib on the insole there is provided in the molded product a smooth upper surface, particularly desirable in the manufacture of shoe soles. The position of the insert 50 in the mold cavity during the mold charging operation may be seen in FIGS. 1 and 4.

In the mold charging operation a charge of injection material, such as fluid plastic or rubber, is injected from a nozzle 64 through a suitable sprue passage in a barrel assembly 66 arranged to communicate with the mold cavity. In order to prevent escape of fluid from the mold cavity after the barrel assembly 66 has been disengaged from the nozzle 64, a suitable gate valve 68 (FIG. 1) is provided in that portion of the barrel assembly 66 projecting rearwardly from the carrier plate 4. The operation of the gate valve is fully described in the above mentioned patent application.

In the operation of the machine an ambulatory mold assembly advances into the mold charging station with the gate valve 68 open preparatory to the mold charging operation. The movement of the mold cavity into the injection station causes, by means not shown, the beginning of the plastic charging operation through the nozzle 64. As the fluid material enters the mold cavity the rib 54 partially obstructs its heelward flow causing the fluid to have an equal tendency to flow toewardly. As may be seen in FIG. 4, before the injection molding process is completed the rib insures that the forepart portion of the mold cavity is completely filled. Means (not shown) in the area of the heel cavity sense the filling of the mold cavity and operate to terminate the injection of fluid into the cavity.

It is to be understood that the present invention is by no means limited to the particular construction shown in the drawings, but also comprises any modifications within the scope of the appended claims.

Having thus described my invention, what I claim as new and desire to secure by Letters Patent of the United States is:

1. A preformed tread piece adapted for incorporation into a premolded sole and heel unit by positioning in the cavity of a mold having heel and forepart portions into which fluid injection material is injected through an opening located opposite the foot facing side of the tread piece, said tread piece having means for retarding the flow of injected material into one of said portions of said cavity and promoting complete filling of the second of said portions of said cavity.

2. A preformed tread piece adapted for incorporation into a premolded sole and heel unit by positioning in the cavity of a mold having heel and forepart portions into which fluid injection material is injected through an opening located opposite the foot facing side of the tread piece, said tread piece having means comprising an upright rib disposed to retard the flow of injected material into one of said portions of said cavity and to promote the flow of said material into the second of said portions of said cavity.

3. A preformed tread piece adapted for incorporation into a premolded sole and heel unit by positioning in the cavity of a mold having heel and forepart portions into which fluid injection material is injected through an opening located opposite the foot facing side of the tread piece, said tread piece having a rib attached thereto on its foot facing side, said rib being disposed between the opening through which plastic is injected and one of said portions of the mold cavity, thereby to retard the flow of the injected material into the said one portion of the mold cavity and promote complete filling of the second portion of the mold cavity.

4. A preformed tread piece adapted for incorporation into a premolded sole and heel unit by positioning in the cavity of a mold having heel and forepart portions into which fluid injection material is injected through an opening located opposite the foot facing side of the tread piece, said tread piece having a rib attached thereto on its foot facing side, said rib extending widthwise of the tread piece, the ends of the rib extending to points short of the side edges of the tread piece, said rib being arranged whereby to retard the flow of injected material to the region of the mold cavity in which there is no tread piece and to promote complete filling of that region of the mold cavity in which the tread piece rests.

5. A preformed tread piece adapted for incorporation into a premolded sole and heel unit by positioning in the cavity of a mold having heel and forepart portions into which fluid injection material is injected through an opening located opposite the foot facing side of the tread piece, said tread piece having near its heelward end on its foot facing side means for retarding the flow of injected material to the heel end of the mold and promoting complete filling of the forepart end of the mold.

6. A preformed tread piece adapted for incorporation into a premolded sole and heel unit by positioning in the cavity of a mold having heel and forepart portions into which fluid injection material is injected through an opening located opposite the foot facing side of the tread piece, said tread piece having a structure extending into the shank portion of the unit, said tread piece having attached thereto on the foot facing side a rib disposed substantially along the heelward edge of said structure, the ends of the rib extending to points short of the side edges of the tread piece.

7. A preformed tread piece adapted for incorporation into a premolded sole and heel unit by positioning in the cavity of a mold having heel and forepart portions into which fluid injection material is injected through an opening located opposite the foot facing side of the tread piece, said tread piece having a V-structure extending into the shank portion of the unit, and said tread piece having a rib attached thereto on the foot facing side of the tread piece and exending from the point of said V outwardly toward either side edge of the tread piece to points respectively short of the extreme width points of the tread piece.

8. A preformed leather tread piece adapted for incorporation into a premolded sole and heel unit by positioning in the cavity of a mold having heel and forepart portions into which fluid injection material is injected through an opening opposite the foot facing side of the tread piece, said tread piece having near its heelward end and located heelwardly of the opening through which plastic is injected an upright leather rib extending widthwise of the tread piece, the ends of the rib extending to points short of the side edges of the tread piece, said rib being arranged whereby to retard the flow of injected material into the heel portion of the mold cavity and to promote complete filling of the forepart portion of the mold cavity.

References Cited by the Examiner

UNITED STATES PATENTS

| | | | |
|---|---|---|---|
| 1,078,652 | 11/1913 | Winslow | 36—34 |
| 1,701,509 | 2/1929 | Ryberg | 36—34 |
| 1,798,807 | 3/1931 | Posner | 36—34 |
| 1,872,124 | 8/1932 | Crafts | 36—34 |
| 2,057,839 | 10/1936 | Morrison | 36—34 |
| 2,088,263 | 7/1937 | Grouven | 36—34 X |
| 2,135,844 | 11/1938 | Qrurk | 36—34 |
| 2,763,028 | 9/1956 | Blake | 18—42 |
| 3,116,566 | 1/1964 | Ferreira | 36—30 |
| 3,177,598 | 4/1965 | Ferreira | 36—30 |

WILLIAM J. STEPHENSON, *Primary Examiner.*